Feb. 5, 1924.  1,482,408
E. PIRON
ABSORPTION DEVICE
Filed May 29, 1922
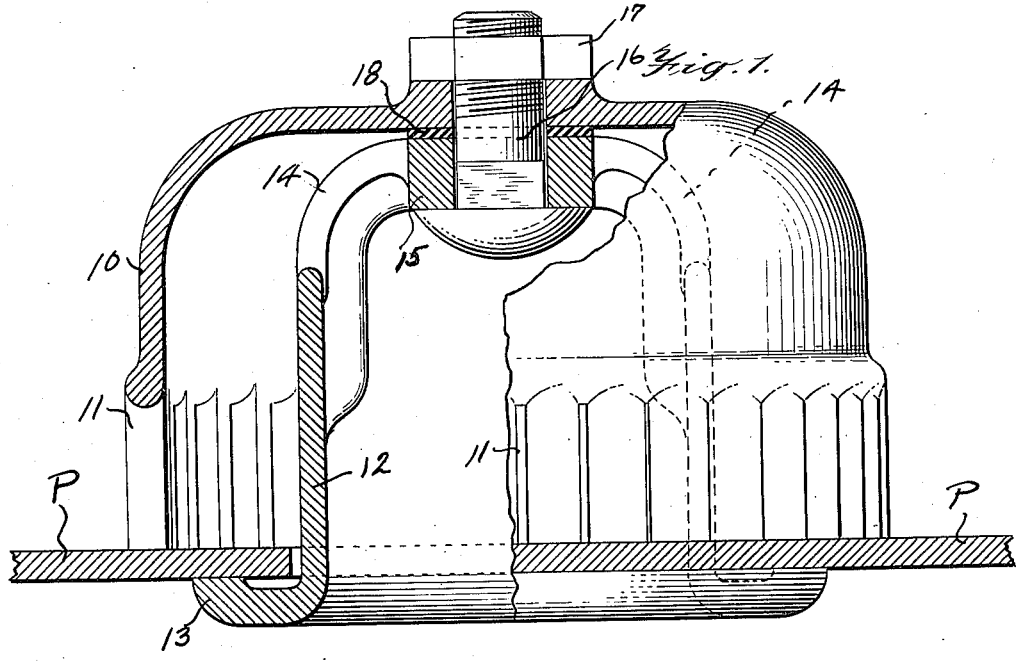
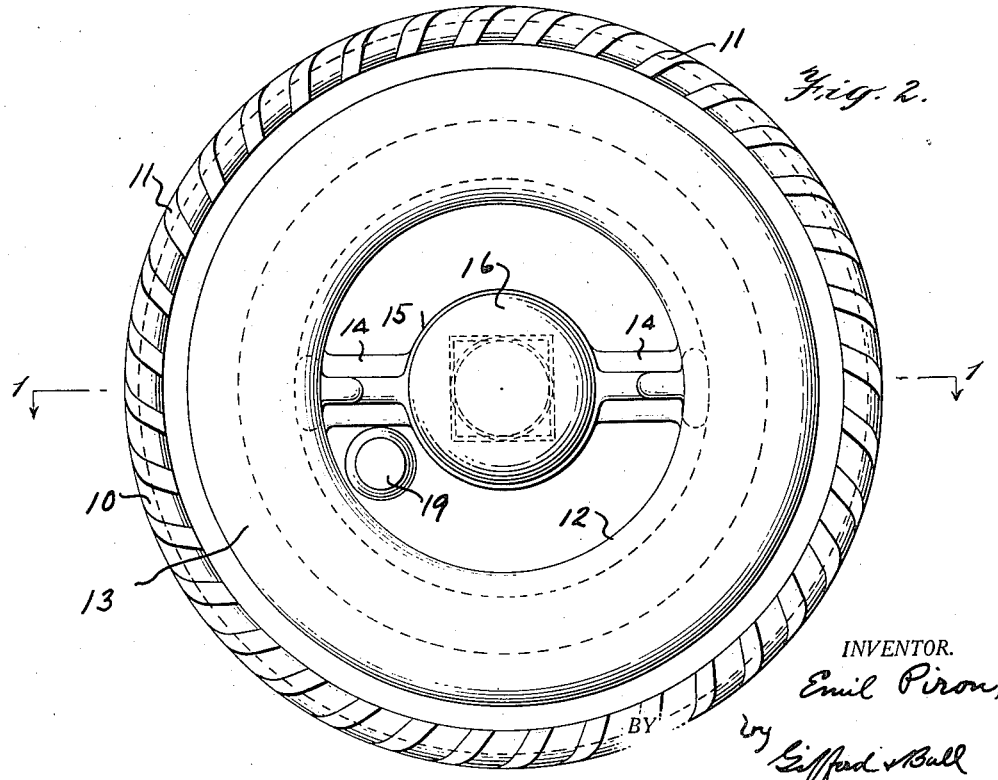
INVENTOR.
Emil Piron,
BY
Gifford & Bull
ATTORNEYS Patented Feb. 5, 1924.                                              1,482,408

UNITED STATES PATENT OFFICE.

EMIL PIRON, OF NEW YORK, N. Y., ASSIGNOR TO PIRON COAL DISTILLATION SYSTEMS, INC., OF NEW YORK, N. Y., A CORPORATION OF DELAWARE.

ABSORPTION DEVICE.

Application filed May 29, 1922. Serial No. 564,345.

*To all whom it may concern:*

Be it known that I, EMIL PIRON, a subject of the King of the Belgians, residing at New York city, in the county of New York and State of New York, have invented certain new and useful Improvements in Absorption Devices, of which the following is a specification.

My present invention relates to improvements in the hood or caps used in absorption devices, such as distilling columns or rectifying columns of the well known type, in which there is a series of superimposed communicating chambers in which the vapor or gas passes upwards successively through the chambers to be brought into contact with a fluid therein, the fluid flowing downwards from chamber to chamber. In such devices, it is usual to provide an arrangement in which the liquid flows slowly in a horizontal direction across a plate or shelf, the gas containing the substances to be absorbed being introduced into this liquid by bubbling through it. It has heretofore been proposed to produce the contact between the gas and the liquid by means of hoods or umbrellas, the lower edges of which are located in the liquid flowing across the plate and the gases being introduced into the interior of the hood, from which interior the gases flow into the liquid on the plate through openings at the lower edge of the hood. I have found, however, that if the gases pass out radially or in directions at right-angles to the walls of the hoods, there is a tendency of the liquid (which is flowing very slowly in any case) to become saturated at points adjacent the gas openings, and consequently less effective to take up more of the substances to be absorbed.

One of the objects of my invention is to provide an absorption device in which the gases will pass into the liquid in such a manner as to cause the liquid to form eddies or swirls at the gas openings and thus set up a mixing action in the liquid, so that the material to be absorbed does not become concentrated in any portion of the liquid.

With this and other objects in view, my invention consists in the arrangement hereinafter described and more specifically pointed out in the appended specification.

For purposes of illustration I have shown a preferred form of such a hood and it will be understood that a number of these hoods will be associated fairly closely together on the plate across which the absorbing liquid is flowing.

In the drawings, Figure 1 is a side elevation, partly in section, of an illustrative form of hood embodying my invention, part of Fig. 1 being taken on the line 1—1 of Fig. 2, and Fig. 2 is a bottom view of the hood shown in Fig. 1 with the plate to which the device is attached removed.

Like reference characters indicate like parts in the different views.

In the illustrative arrangement, a hood 10, made substantially as a cylinder closed at one end, has its lower edge resting on a plate P of an absorption device. Over the upper surface of this plate P, the absorbing liquid or menstruum is made to flow in the usual manner. The lower edges of the hood 10 are provided with a plurality of slots 11 extending through the walls of the hood in a non-radial direction, that is, one which is not perpendicular to the wall surface of the hood.

As a means for introducing gas into the hood and also to attach the hood to the plate P, I may provide a gas inlet pipe 12 having a flange 13 at its lower edge and provided at its upper edge with a pair of arms 14, 14 supporting a boss 15 through which extends a bolt 16 provided with a nut 17 and a gasket 18 by all of which the pipe 12 may be drawn upward and the hood 10 downward to clamp the device to the plate P, the gasket 18 serving to form a gastight joint between the two parts. The bolt 16 may be provided with a square under its head to keep the same from turning, and in order to prevent the pipe 12 and the hood 10 from rotating relatively as the nut 17 is drawn up, I may provide a lug 19 extending down from the inner surface of the hood to engage one of the arms 14. The gas inlet pipe 12 extends through a hole in the plate P and communicates with the space below that plate.

In pratice it will be understood that a number of these hoods will be associated with each plate P of the absorption apparatus and will be relatively close together. The liquid flowing over the plate P will be maintained deep enough to cover the upper ends of the slots 11. Gas in the compartment below the plate P will find its way through the several pipes 12 into the upper part of each of the hoods 10 and from thence will be forced into the liquid through the slots 11. By reason of the direction of the slots 11 through the walls of the hood 10, the gases, as they pass into the liquid, will produce an eddying or a swirling action adjacent the hood and this will tend to mix the liquid, especially by reason of the eddies formed around each of the hoods intersecting the eddies formed around the adjacent hoods. By reason of these various eddies, the entire mass of liquid flowing across the plate P is thoroughly mixed to prevent the concentration of the material to be absorbed in any one portion of the liquid.

While I preferably provide vertical slots as the gas exits, it will be understood that other forms of openings may be used. For instance, there may be a series of round holes which, if non-radial, will produce the action above described. Similarly, it will be understood that the manner in which the hood may be attached to the plate P may be varied within wide limits. While, preferably, I arrange the hood so that its lower edges contact with the plate P to form an abutment for the pressure produced by the nuts 17 to draw the flange 13 against the lower side of the plate, this is not essential so long as the lower edges of the hood are brought adjacent to the upper surface of the plate P.

While for illustrative purposes I have shown the hood 10 as circular in cross section, it will be understood that any other shape may be used. In some forms of absorption apparatus the gas passes through elongated openings in the plate P, which are, in effect, slots, and in such case the hood would, of course, be correspondingly long and narrow to cover such a slot-like opening. It will also be understood that I have used the term "non-radial" to describe a direction other than one at right-angles to the wall at the point through which the openings pass and I do not mean to limit myself by this term to a hood having a circular cross section.

I claim:—

1. In a device of the class described, a plate over which liquid may be passed, a hood above the plate and having its lower edge adjacent the plate, and means to deliver gas from beneath the plate to the interior of the hood, said hood having openings at its lower edge arranged to cause the gas to flow from the hood into the liquid in a non-radial direction.

2. In a device of the class described, a plate over which liquid may be passed, a hood above the plate and having its lower edge adjacent the plate, the wall of the hood at its lower edge being provided with a series of substantially vertical slots extending non-radially through said wall, and means to deliver gases from beneath the plate to the upper part of the hood.

3. An absorption hood arranged to be connected to the horizontal plate of an absorption device, said hood having its lower edge adapted to contact and make a tight joint with the plate and having a plurality of substantially vertical slots extending non-radial through the wall of the hood at its lower edge, a gas inlet pipe extending into the hood from beneath the same and having a flange adapted to contact with the under side of the plate and connecting means to draw said pipe toward the hood to press said flange against the plate.

EMIL PIRON.